Feb. 22, 1944.  A. E. OZOUF  2,342,598
CARCASS DIPPING APPARATUS
Filed Nov. 6, 1942  5 Sheets-Sheet 4
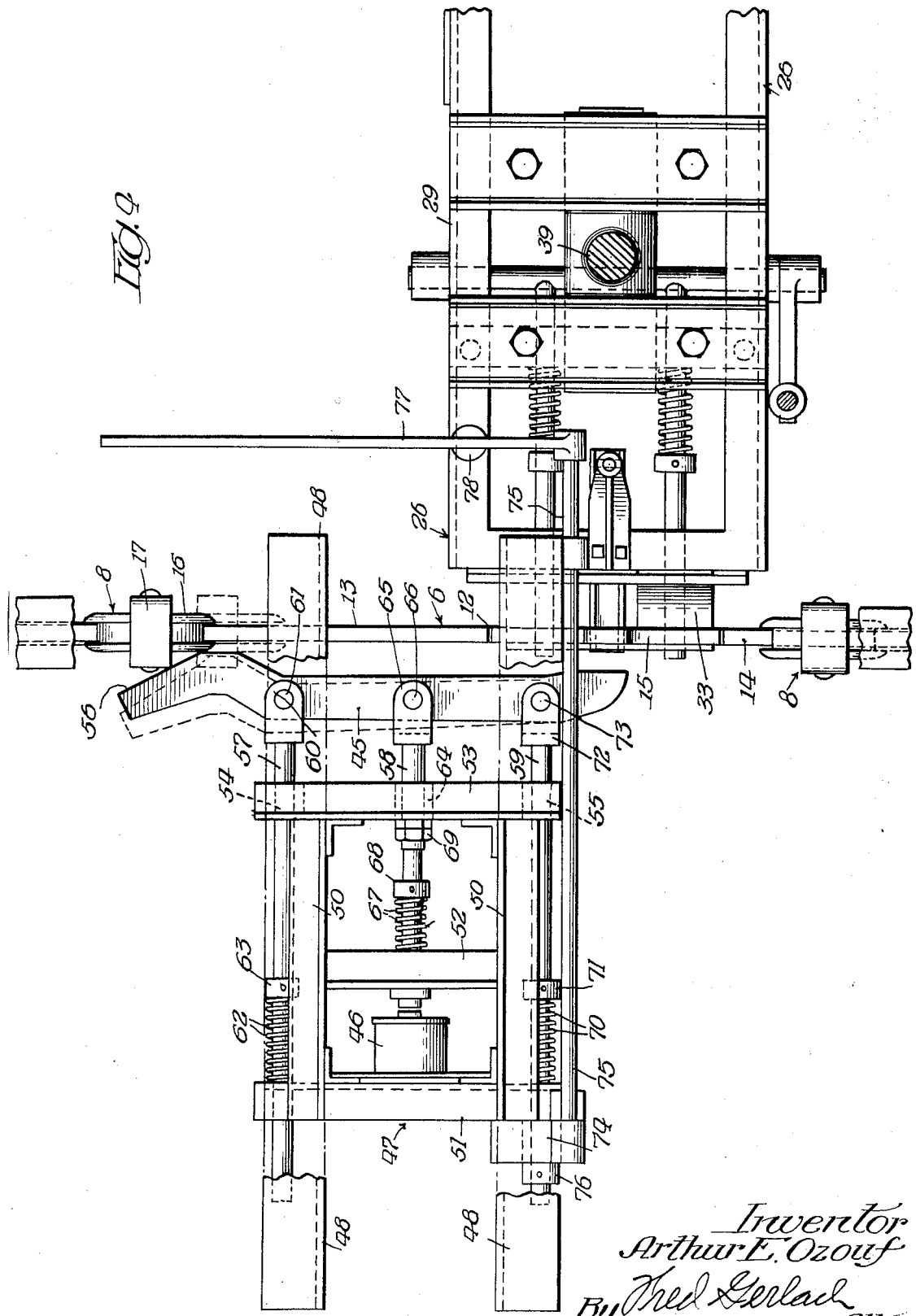
Inventor
Arthur E. Ozouf
By Fred Gerlach
Atty.

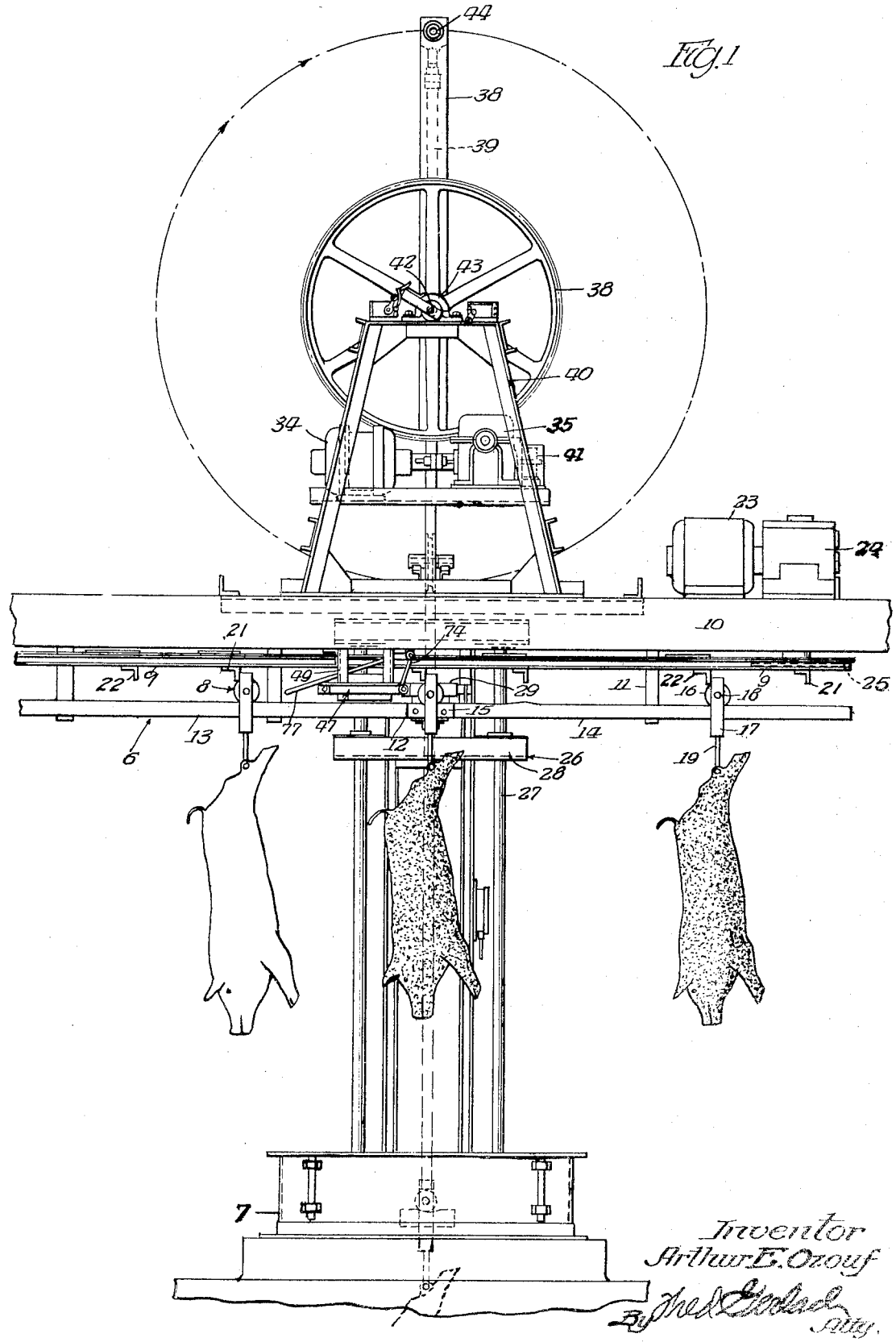

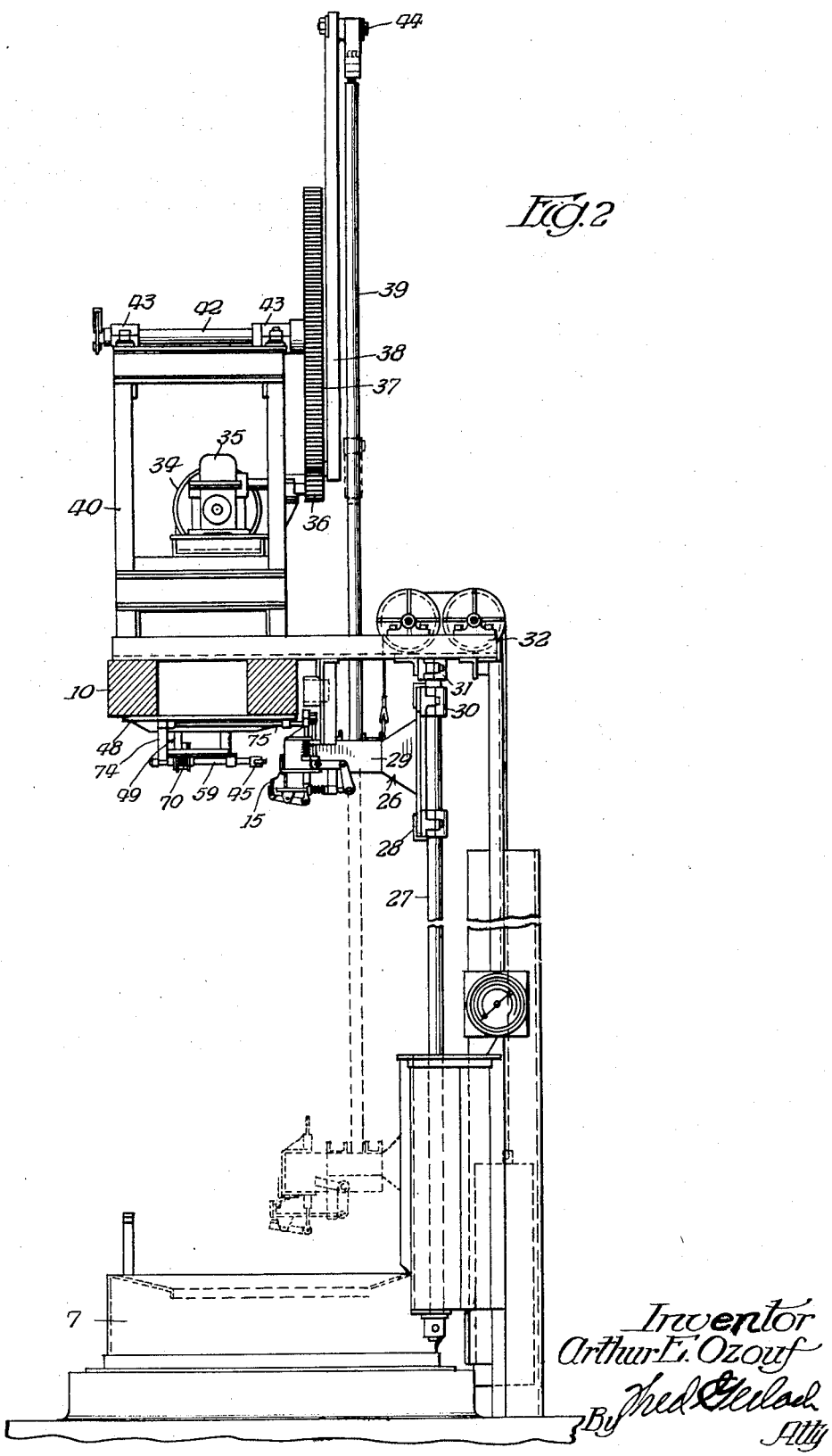

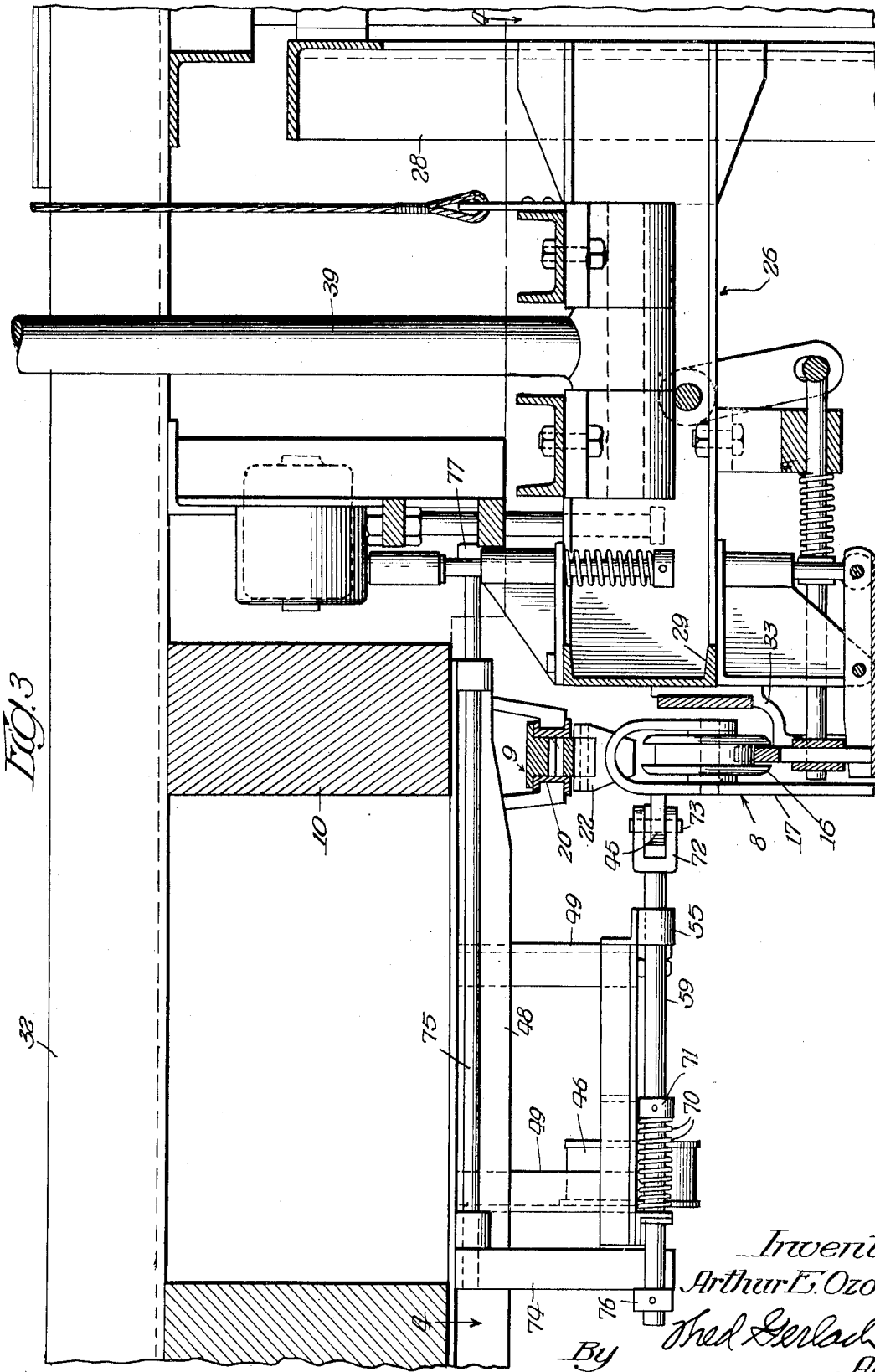

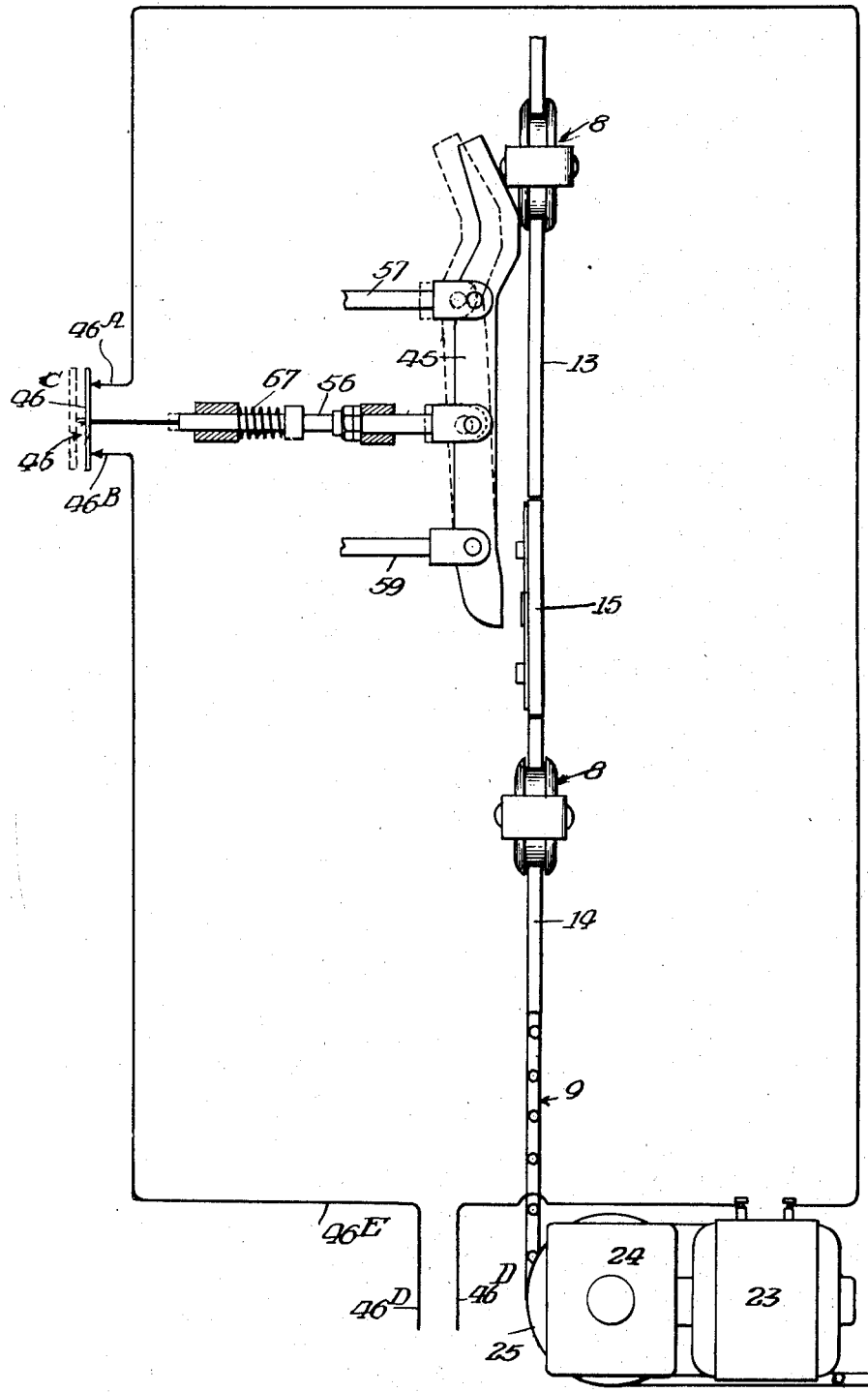

Patented Feb. 22, 1944

2,342,598

UNITED STATES PATENT OFFICE 2,342,598

CARCASS DIPPING APPARATUS

Arthur E. Ozouf, Chicago, Ill., assignor to The Allbright-Nell Co., Chicago, Ill., a corporation of Illinois Application November 6, 1942, Serial No. 464,747

3 Claims. (Cl. 17—1)

The present invention relates to apparatus for dipping machine dehaired hog carcasses in a tank of hot, congealable, resinous material in order to form seal-like coatings which, upon stripping or peeling from the carcasses after partial hardening of the material, effect removal of the hair and roots remaining on the carcasses after the machine dehairing operation. More particularly the invention relates to that type of carcass dipping apparatus which operates in conjunction with an overhead rail for use with gambrel supporting trolleys in conveying the carcasses from the dehairing machine or the usual gambrel applying table at the discharge end of the dehairing machine to either a polishing machine or the carcass cutting and inspection line and comprises (1) a rail section which overlies the tank, forms a part of the overhead rail, and is shiftable vertically between an up position wherein it fits within a cutout in the rail and is adapted to receive the carcass supporting trolleys as they travel one at a time along the rail, and a down position wherein any carcass suspended therefrom is caused to be immersed in the tank for coating purposes, (2) mechanism for shifting the rail section downwards into its down position after a carcass supporting trolley travels thereon and then raising the section into its up position in order to permit the dipped carcass to travel further along the rail and render the rail section operative to receive the next following carcass on the overhead rail, and (3) a motor driven constant speed finger equipped conveyor which is disposed adjacent the overhead rail and serves to move the carcass supporting trolleys so that they travel first along the preceding rail section, that is, the section of the overhead rail that precedes the cutout, then onto the vertically movable section and then, after dipping of the carcasses and return of the movable rail section to its up position, along the following rail section of the overhead rail.

The primary object of the invention is to provide a carcass dipping apparatus of this type having means for automatically stopping the conveyor when a trolley approaches the cutout in the overhead rail while the vertically movable rail section is in a position other than its up position.

Another object of the invention is to provide a carcass dipping apparatus which is generally of new and improved construction and in addition is an improvement upon, and is safer to use than, that which is disclosed in, and forms the subject matter of, an application for United States Letters Patent filed by Adolph G. Ackermann on November 6, 1942, Serial No. 464,759.

Other objects of the invention and the various advantages and characteristics of the present carcass dipping apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front view of a carcass dipping apparatus embodying the invention;

Figure 2 is a side view of the apparatus;

Figure 3 is an enlarged vertical transverse section of the upper portion of the apparatus;

Figure 4 is an enlarged plan view showing in detail the vertically movable carriage on which the reciprocatory rail section is mounted and also the means for automatically stopping the conveyor in the event a carcass supporting trolley approaches the cutout in the overhead rail while the vertically movable rail section is in a position other than its up position; and Figure 5 is a diagrammatic view of the automatic stopping means for the conveyor.

The apparatus which is illustrated in the drawings constitutes the preferred form or embodiment of the invention. It is designed for use in a combined slaughtering and packing house having an overhead rail 6 for conveying hog carcasses from a dehairing machine (not shown) to either the usual cutting and inspection line or a polishing machine in front of the line, and serves, during operation thereof, to dip the carcasses, one at a time, into a tank 7 containing hot congealable resinous material in order to apply substantially complete seal-like coatings which, when stripped or peeled from the carcasses after congelation of the material, remove the hair and roots remaining on the carcasses after the machine dehairing operation. The overhead rail 6 is adapted to support the hog carcasses in an inverted depending position by way of trolleys 8 and is associated with a conveyor 9 which, upon drive thereof causes the carcass supporting trolleys to travel along the rail. As shown in Figure 1, the overhead rail is supported in a depending manner from an overhead beam 10 by way of straps 11. It extends horizontally and is arranged so that the carcasses during travel therealong pass over the tank 7. The tank is preferably embedded in the floor of the combined slaughtering and packing house wherein the improved apparatus is employed. It is heated in any suitable manner, such, for example, as by way of steam coils in order that the resinous material therein is maintained in a molten or liquid condition. The overhead rail 6 has a cutout 12 directly over the tank and comprises a fixed preceding rail section 13 and a fixed following rail section 14. The preceding rail section leads from the aforementioned dehairing machine for the hog carcasses or the gambrel applying table at the discharge end of the dehairing machine to the cutout 12 over the tank 7 and the following rail section 14 leads from the cutout to the aforementioned polishing machine or cutting and inspection line. A vertically movable rail section 15 constituting one of the elements of the dipping apparatus, is associated with, and forms a part of, the overhead rail 6. This rail section 15 is shiftable back and forth between an up position wherein it fits within the cutout 12 and serves to bridge or connect the preceding and following rail sections 13 and 14, and a down position wherein it is disposed adjacent the top of the tank 7. When a carcass carrying trolley travels onto the rail section 15 the section is shifted downwards to its down position and then raised to its up position. During the down stroke of the rail section 15 the carcass which is suspended from the trolley on the said rail section 15 enters the tank 7, as shown by dotted lines in Figure 1, and is coated with the heated congealable resinous material in the tank. After shift of the rail section 15 into its up position the trolley having the coated carcass suspended therefrom moves onto and travels along the following rail section 14 of the overhead rail and the rail section 15 is in a position to receive the next following carcass supporting trolley 8. The trolleys comprise grooved wheels 16 and frames 17 and are moved along the rail 6 by way of the conveyor 9. The wheels 16 of the trolleys ride on the upper surfaces of the rail sections 13, 14 and 15. The trolley frames 17 are vertically elongated and have inverted U-shaped upper ends which overlie the wheels and are connected thereto by way of stub axles 18. The lower ends of the trolley frames underlie the rail sections during travel of the trolleys therealong and have gambrels 19 suspended therefrom by way of I-bolts or like attaching means. The gambrels are adapted to be applied to the hocks of the carcasses after the latter have been subjected to the action of the dehairing machine and extend substantially horizontally when the trolleys to which they are applied move or travel along the overhead rail 6.

The conveyor 9 for moving the carcass supporting trolleys along the overhead rail 6 is of the chain variety and overlies and extends in parallel relation with the rail. It is mounted between a pair of laterally spaced channel bars 20 beneath the beam 10 and has on the under side thereof a series of pairs of pusher fingers 21 and 22. The pairs of fingers are spaced equidistantly apart, as shown in Figure 1. The fingers 21 are located a short distance ahead of the fingers 22 and are adapted to engage the frames of the trolleys and push or feed the trolleys along the preceding rail section 13. The fingers 22 serve as follow-up fingers and are adapted to engage the trolley frames and feed or propel the trolleys while the latter are on the following rail section 14. It is contemplated that when the apparatus is in operation the conveyor 9 be driven continuously at a comparatively low speed. After a carcass is applied to a gambrel on a trolley the trolley is placed on the preceding rail section 13 ahead of one of the pusher fingers 21. As soon as the finger strikes the frame of the trolley the trolley is moved along the rail section 13 and then onto the vertically movable rail section 15. As soon as the trolley moves onto such section the latter is shifted downwards and upwards for carcass dipping purposes. During downward and upward shift of the rail section 15 the pusher finger 21 that has pushed the trolley onto the rail section 15 moves onward and the pusher finger 22 directly therebehind moves or travels into a position wherein it is in readiness to engage the frame of the trolley on the rail section 15 as soon as the rail section reaches its up position. As soon as the rail section is shifted into its up position the adjacent pusher finger 22 contacts the frame of the trolley on the rail section 15 and causes the trolley to move off the rail section 15 and along the following rail section 14 of the overhead rail 6. The conveyor 9 is driven for carcass moving or propelling purposes by way of an electric motor 23, a gear type speed reducer 24 and a sprocket 25. The motor 23 is mounted on the overhead beam 10 and has the armature shaft thereof connected to the drive shaft of the speed reducer 24. The sprocket 25 meshes with the chain constituting the conveyor 9 and is connected to the driven shaft of the speed reducer. The electric motor 23, the speed reducer 24, and the sprocket 25 are so designed that during operation of the motor the conveyor 9 travels at such speed that after one of the pusher fingers 21 delivers a carcass supporting trolley onto the vertically movable rail section 15 the following pusher finger 22 is in a position to propel the trolley after down and up movement of the rail section 15. In other words, the conveyor 9 for propelling the carcass supporting trolleys along the overhead rail 6, is driven in synchronism or in timed relation with the combined down and up movement of the vertically movable rail section 15.

The dipping apparatus comprises in addition to the rail section 15, a vertically slidable carriage 26 for the rail section and mechanism for shifting the carriage up and down for carcass dipping purposes. The carriage is mounted for vertical sliding movement on a pair of laterally spaced upstanding rods 27 and comprises a vertically extending angular bar type frame 28 and a U-shaped bracket 29 in front of, and in rigid relation with, the frame. The frame has sleeves 30 fixedly connected to the corners thereof and these surround and are adapted to slide vertically on the rods 27. The lower ends of the rods are fixedly mounted in a fixed bracket type structure directly behind the tank 7 and the upper ends of the rods fit within a pair of brackets 31 on the rear end of a horizontally extending platform 32. The latter, as shown in Figure 2, overlies the removable rail section 15 and is mounted on the overhead beam 10. The rail section 15 is located in front of the U-shaped bracket 29 and is fixedly secured thereto by way of a pair of laterally spaced brackets 33. By reason of the fact that the rail section 15 is fixedly connected to the bracket 29 down and up sliding movement of the carriage 26 on the rods 27 results in corresponding movement of said rail section.

The mechanism for shifting the carriage consists of an electric motor 34, a gear type speed reducer 35, a pinion 36, a gear wheel 37, a crank 38, and a connecting rod 39, and is mounted for the most part above the platform 32. The electric motor is mounted on an A-shaped structure 40 on the front end of the platform 32. It is disposed in opposed relation with the speed reducer 35 and has the armature shaft thereof coupled or otherwise connected to the drive shaft of the speed reducer. The speed reducer, as shown in Figure 1, is also mounted on the frame structure 40. It is of conventional or standard design and has associated therewith a solenoid type brake 41. The brake is in circuit with the electric motor 34 and is arranged so that it operates immediately to stop the gearing and armature shaft when the supply of current to the motor 34 is cut off. The pinion 36 is located behind the frame structure 40 and is keyed or otherwise fixedly secured to the driven shaft of the speed reducer 35. It meshes with, and serves to drive, the gear wheel 37. The latter overlies the pinion 36 and is fixed to a horizontal shaft 42 which is journaled in a pair of bearings 43 on the upper portion of the frame structure 40. The crank 38 is in the form of an arm which is mounted on, and extends radially with respect to, the gear wheel 37. The connecting rod 39 is located in back of the gear wheel 37, as shown in Figure 2, and has one end thereof connected to the outer or distal end of the crank 38 by a pivot pin 44. The other end of the connecting rod is pivotally connected to the carriage 26 by way of a pin which is carried by the U-shaped bracket 29 of the carriage 26. When the crank 38 extends upwards in a vertical position, as shown in Figure 1, the connecting rod 39 is in a raised position and maintains the carriage 26 and the rail section 15 in their up position. When the gear wheel 37 is rotated throughout a 360° arc the carriage and vertically movable rail section move downwards during rotation of the gear wheel throughout the first 180° and then move upwards during the next 180° turning or rotative movement on the part of the gear wheel. When the crank 38 extends downwardly in a vertical position the carriage and movable rail section are in their fully lowered position. The crank is preferably of such length that when it is in its down position the carriage is lowered to a point where the carcass depending from the trolley on the rail section 15 is substantially fully immersed in the material in the tank 7. It is contemplated that the crank will be rotated or turned one complete revolution each time a carcass carrying trolley is moved by the chain type conveyor 9 onto the rail section 15. It is also contemplated that the speed of turn or rotation of the crank will be such that the carriage 26 and the rail section 15 will be returned to their up position directly before the next following pusher finger 22 on the conveyor reaches the cutout 12 in the overhead rail 6. The motor 34 is controlled automatically so that as soon as a carcass supporting trolley moves onto the rail section 15 the crank 38 is rotated throughout an arc of 360° in order to cause dipping of the carcass into the material in the tank and then return of the carcass to a position wherein it is in readiness to be fed along the following rail section 14 by the next following pusher finger 22. Any suitable automatic control means for the electric motor 34 may be employed, such, for example, as that which is shown and disclosed in aforementioned United States application Serial No. 464,759.

In connection with use of the apparatus the carriage 26 may fail to return to its up position either because of frictional gripping of the carriage sleeves 30 with respect to the upstanding rods 27 or failure of the electrical circuit for the motor 34. Should the carriage in connection with a carcass dipping operation fail to return to its up position for one reason or another the chain conveyor 9, due to the fact that its drive is independent of the motor 34, would normally feed the trolley for the carcass following the one being dipped into the cutout 12 and such trolley and its carcass would hence fall with resultant injury or damage. In order to prevent any failure and resultant injury of this character the apparatus includes means for automatically stopping the conveyor when a trolley approaches the cutout in the overhead rail 6 while the vertically movable rail section 15 is in a position other than its up position. This means comprises a cam lever 45 and a normally closed push button type switch 46. The switch 46 is carried by a horizontal frame 47 and is included in the circuit for supplying current to the electric motor 23 constituting part of the mechanism or means for driving the conveyor 9. As shown in Figure 5, the switch 46 comprises a pair of laterally spaced fixed contacts 46A and 46B and a moveable bridge piece 46C. The bridge piece is normally disposed in a position wherein it extends across and serves electrically to connect the two contacts 46A and 46B. The circuit for supplying current to the electric motor 23 comprises a pair of conductors 46D and 46E. These two conductors are connected to any suitable source of current supply. The conductor 46D has the electric motor 23 included in it and leads to the contact 46A of the switch 46. The conductor 46E is connected to and leads from the contact 46B. The frame 47 is located beneath the front end of the platform 32 and is positioned directly in front of the discharge end of the preceding rail section 13 of the overhead rail 6. It is suspended from a supporting structure 48 by way of vertically extending angle bars 49 and comprises a pair of laterally spaced parallel side bars 50, a front crossbar 51, an intermediate crossbar 52 and a rear crossbar 53. The three crossbars extend between, and serve to space apart, the side bars 50. The ends of the front and rear crossbars 51 and 53 that face in the direction of the dehairing machine for the hog carcasses or the gambrel applying table at the discharge end of the dehairing machine, project outwards of the adjacent side bar 50 and are shaped to form a pair of axially aligned bearings 54. The other ends of the crossbars 50 and 52 project outwardly of the adjacent side bar 50 and are shaped to form a pair of axially aligned bearings 55. The switch 46 in the circuit for the electric motor 23 is located adjacent the central portion of the front crossbar 51 and is arranged so that the push button thereof faces rearwards, as shown in Figure 4. When the push button is depressed, i. e., shifted forwards, as hereinafter described, the switch 46 opens and thus by interrupting the flow of current to the motor 23 effects instantaneous stoppage of the conveyor 9. The cam lever 45 is located between the rear crossbar 53 of the frame 47 and the discharge end of the preceding rail section 13 and extends horizontally. It is provided at the leading end thereof with a cam 56 and is yieldingly supported by way of three slide rods 57, 58 and 59. The slide rod 57 extends transversely of the overhead rail 6 and is mounted for longitudinal sliding movement in the bearings 54. The rear end of the slide rod is provided with a fork 60 which straddles the cam lever 45 at a point inwards of the cam 56 and is pivotally connected to the cam lever by way of a pivot pin 61. A compression spring 62 between the bearing 54 on the crossbar 51 and a collar 63 on the central portion of the slide rod 57 serves to urge said slide rod 57 rearwards. The slide rod 58 is disposed between, and in parallel relation with, the slide rods 57 and 59 and extends through, and is slidably mounted in, bearings 64 on the central portions of the intermediate crossbar 52 and the rear crossbar 53 of the frame 47. The front end of the slide rod 58 is aligned with, and normally spaced rearwards of, the push button of the switch 46. The rear end of the slide rod 58 is provided with a fork 65 and this straddles the central portion of the cam lever 45 and is pivotally connected thereto by way of a pivot pin 66. A compression spring 67 between the bearing 64 on the central portion of the intermediate crossbar 52 and a collar 68 on the central portion of the slide rod 58 serves to urge said slide rod rearwards out of engagement with the push button of the switch 46. A stop 69 in the form of a pair of nuts on the central portion of the slide rod 58 coacts with the bearing 64 on the central portion of the rear crossbar 54 to limit rearward movement of the slide rod 58 and the cam lever 45 relatively to the frame 47. The slide rod 59 extends through, and is longitudinally slidable in, the bearings 55. A compression spring 70 around the central portion of the slide rod 59 abuts against the bearing 55 on the front crossbar 51 and a collar 71 on the slide rod 59 and serves to urge said slide rod rearwards. The rear end of the slide rod 59 is provided with a fork 72 and this straddles the trailing end of the cam lever 45 and is connected thereto by way of a pivot pin 73. The springs 62 and 70 for urging rearwards the slide rods 57 and 59, respectively, are preferably under equal compression and each is under less compression than the compression spring 67 for the centrally disposed slide rod 58. The three slide rods, due to the action of their compression springs, normally hold the cam lever 45 in a position wherein it is away from the rear crossbar 53 and adjacent the discharge end of the preceding rail section 13. In such position of the cam lever the slide rod 58 is out of contact with the push button of the switch 46 and the switch remains in a closed position. The slide rods, however, permit the cam lever to rock either with the pivot pin 66 as the fulcrum point or the pivot pin 73 as the fulcrum point, as described hereafter. The cam 56 at the leading end of the lever 45 is so arranged that the trolley frames 16 strike against it and force the lever forwards as the trolleys travel one at a time along the preceding rail section 13. When the vertically movable rail section 15 is in its up position wherein it bridges the cutout 12 the carcass supporting trolley being fed onto the rail section 15 strikes against the cam 56 and causes the lever to rock about the pivot pin 66 in a counterclockwise direction, as viewed in Figure 3. Such rocking on the part of the cam lever results in no displacement whatsoever of the slide rod 58 and hence the switch 46 is unaffected and there is no interruption of the supply of current to the electric motor 23 for driving the conveyor. A radially extending arm 74 on a rock shaft 75 serves to lock the slide rod 59 against rearward movement when the carriage 26 and the rail section 15 are in any position other than their up position. When the slide rod 59 is locked against rearward sliding movement by the arm 74 due to the carriage being out of its up position, any carcass supporting trolley which is moved by the conveyor 9 into engagement with the cam 56 on the leading end of the lever 45 causes the lever to rock or fulcrum about the pivot pin 73 in a counter-clockwise direction as viewed in Figure 3. Such rocking on the part of the cam lever causes the slide rod 58 to move forwards into a position wherein the front end thereof contacts the push button of the switch 46 and effects opening of the switch. The rock shaft 75 is positioned above, and extends in parallel relation with, the slide rod 59 and is journaled in suitable bearings on the supporting structure 48. The arm 74 extends radially from the front end of the rock shaft and is adapted when the shaft 75 is rocked in one direction, to fit between the front crossbar 51 of the frame 47 and a collar 76 on the front end of the slide rod 59 and thus lock such slide rod against rearward movement. When the rock shaft is rocked in the opposite direction the arm 74 swings away from the collar 76 and thus releases the slide rod so that it is free to slide rearwards in connection with normal rocking of the cam lever by the carcass supporting trolleys travelling along the preceding rail section 13 of the overhead rail 6. A heavy lever type arm 77 is secured to, and extends radially from, the rear end of the rock shaft 75 and serves, due to its angular arrangement and the action of gravity on it, to rock the shaft 75 in such direction as to bring the arm 74 into its locking position. Said lever type arm 77 extends downwards at a slight acute angle with respect to the horizontal and overlies the front end of the U-shaped bracket 29 of the carriage 26, as shown in Figure 3. A lug 78 on said bracket is arranged so that it strikes against and swings upwards the arm 77 as the carriage moves upwards into its up position. When the arm 77 is swung upwards by the lug 78 in connection with shift of the carriage into its up position the shaft 76 is so rocked as to cause the arm 74 to swing out of its locking position and thus release the slide rod 59 for rearward sliding movement. As soon as the carriage 26, in connection with a hog dipping operation, moves downwards the lever arm 77 swings downwards and results in the arm 74 swinging into its locking position wherein it holds or locks the slide rod 59 against rearward movement. When the carriage is in its up position and the arm 74 is resultantly out of its locking position the carcass supporting trolley being fed onto the vertically movable rail section 15 on the carriage strikes against the cam 56 as hereinbefore described, and causes rocking of the cam lever about the pivot pin 66. Such rocking does not displace the slide rod 58 and is permitted, as a result of the fact that the slide rod 59 is free, to slide rearwards. After the cam lever is rocked in the aforementioned manner by said trolley the trolley is fed onto the rail section 15 and results in reciprocation of the carriage and dipping of the carcass that is suspended from the trolley thereon. As soon as the carriage 26 moves downwards and thus releases the lever arm 77 the latter swings downwards and through the medium of the shaft 75, causes the arm 74 to swing into its locking position. In the event that the next following trolley on the preceding section 13 of the overhead rail should be fed into engagement with the cam 45 while the carriage is out of its up position the cam lever 45 fulcrums about the pivot pin 73 due to the fact that the slide rod 59 is locked against rearward sliding movement by the arm 74 and hence shifts the slide rod 58 forwards and thus automatically effects opening of the switch 46 and stoppage of the conveyor. In brief, when the carriage is in its up position wherein the rail section 15 is in readiness to receive the next trolley in connection with a carcass dipping operation the cam lever, as a result of the next trolley striking against the cam 56, fulcrums about the pivot pin 66 and is ineffectual so far as opening of the switch 46 is concerned. However, should the next following trolley be fed into contact with the cam 56 while the carriage 26 is in any position other than its up position the cam lever, as the result of locking of the slide rod 59 by the arm 74, pivots about the pivot pin 73 and results in the slide rod 58 moving forwards into a position wherein it contacts the push button of the switch 46 and opens the switch. The cam lever 45, the switch 46, the three slide rods 57, 58 and 59, the rock-type arm 74 and the various parts associated therewith constitute means for automatically stopping the conveyor when a carcass supporting trolley approaches the cutout in the overhead rail while the vertically movable rail section is in a position other than in its up or trolley receiving position. By providing such means in connection with the present dipping apparatus there is no likelihood of a carcass supporting trolley being fed into the cutout 12 while the rail section 15 is out of its up or operative position. The means under consideration is essentially a safety arrangement and prevents dropping of any hog carcass in the event of failure on the part of the mechanism for shifting the carriage 26 back and forth between its down and up positions.

Assuming that the circuit for the electric motor 34 is operative and the conveyor 9 is being driven by the electric motor 23 the operation of the apparatus is as follows: The pusher fingers 21 on the conveyor propel the carcass supporting trolleys in series form along the preceding rail section 13 of the overhead rail 6. As soon as the leading trolley is pushed onto the vertically movable rail section 15 current is supplied to the motor 34 and the latter, through the medium of the speed reducer 35, the pinion 36, and the gear wheel 37, swings the crank 38 throughout an arc of 360°. During down swing of the crank the carriage 26 and the rail section 15 together with the carcass that is suspended from the trolley on the rail section 15 moves downwards toward the dipping tank 7. As the carriage moves downward the carcass enters the tank and receives a coating of the hot resinous material therein. On the up stroke of the crank 38 the carcass is withdrawn from the tank and the carriage and vertically movable rail section are raised into their up position. As soon as the crank reaches the end of its 360° arc the motor 34 stops. As soon as the rail section 15 reaches its up position in connection with stoppage of the electric motor 34 the next following pusher finger 22 engages the trolley on said rail section 15 and pushes it onto and along the following rail section 14. As soon as the trolley leaves the rail section 15 said section is in condition to receive the next following carcass supporting trolley and the same cycle of operations again takes place. Should the carriage 26 stop for any reason whatsoever before returning to its up position the next following carcass supporting trolley on the preceding rail section 13 travels into engagement with the cam 56 and, as previously pointed out, causes the cam lever 45 to fulcrum about the pivot pin 73 and effect opening of the switch 46 and substantially instantaneous stoppage of the electric motor 23 for driving the conveyor.

The herein described carcass dipping apparatus effectively and efficiently fulfills its intended purpose and is characterized by the fact that it may be operated with safety as the result of including or comprising the means for automatically stopping the conveyor driving motor in the event a carcass supporting trolley approaches a cutout while the movable rail section is in a position other than its up position.

The invention is not to be understood as restricted to the details set forth since these may be modified within the scope of the appended claims without departing from the spirit and scope of the invention.

Having thus described the invention what I claim as new and desire to secure by Letters Patent is:

1. The combination with a tank containing coating material, of an overhead rail adapted to have trolleys with carcasses suspended therefrom travel one at a time along it and provided with a cutout over the tank dividing it into a preceding and a following rail section; a power driven pusher finger equipped conveyor extending along the rail and adapted when driven to propel the trolleys therealong; an apparatus for dipping the carcasses into the tank for coating purposes comprising a rail section shaped to fit within the cutout and mounted to move from an up position wherein it bridges said cutout and is adapted to receive a carcass supporting trolley from the preceding rail section and a down position wherein the carcass suspended from the trolley thereon is immersed in the material in the tank and then back again to its up position in order that the trolley thereon with the coated carcass is in a position to be propelled by the conveyor onto the following rail section, and power driven mechanism for moving the rail section between said up and down positions; and means for automatically stopping the conveyor when a trolley on the preceding rail section approaches the cutout while the movable rail element is in any position other than its up position.

2. The combination with a tank containing coating material, of an overhead rail adapted to have trolleys with carcasses suspended therefrom travel one at a time along it and provided with a cutout over the tank dividing it into a preceding and a following rail section; a finger equipped trolley propelled conveyor extending along the rail and having an electric motor for driving it; and apparatus for dipping the carcasses into the tank for coating purposes comprising a rail section shaped to fit within the cutout and mounted to move from an up position wherein it bridges said cutout and is adapted to receive a carcass supporting trolley from the preceding rail section to a down position wherein the carcass suspended from the trolley thereon is immersed in the material in the tank and then back again to its up position in order that the trolley thereon with the coated carcass is in a position to be propelled by the conveyor onto the following rail section, and power driven mechanism for moving the rail section between said up and down positions; and means including a switch in circuit with the electric motor for automatically stopping the motor when a trolley on the preceding rail section approaches the cutout while the movable rail element is in any position other than its up position.

3. The combination with a tank containing coating material, of an overhead rail adapted to have trolleys with carcasses suspended therefrom travel one at a time along it and provided with a cutout over the tank dividing it into a preceding and a following rail section; a finger equipped trolley propelled conveyor extending along the rail and having an electric motor for driving it; and apparatus for dipping the carcasses into the tank for coating purposes comprising a rail section shaped to fit within the cutout and mounted to move from an up position wherein it bridges said cutout and is adapted to receive a carcass supporting trolley from the preceding rail section to a down position wherein the carcass suspended from the trolley thereon is immersed in the material in the tank and then back again to its up position in order that the trolley thereon with the coated carcass is in a position to be propelled by the conveyor onto the following rail section, and power driven mechanism for moving the rail section between said up and down positions; and mechanism for automatically stopping the conveyor when a trolley on the preceding rail section approaches the cutout while the movable rail section is in a position other than its up position embodying a switch adjacent the discharge end of the preceding rail section and in circuit with the electric motor for driving the conveyor, a cam lever yieldingly mounted adjacent the discharge end of the preceding rail section and adapted to be engaged and rocked by the trolleys as they travel successively toward the cutout, a switch controlling element on the cam lever and means for controlling rocking of the cam lever by the trolleys so that said element is effectual to open the switch when the movable rail section is out of its up position but is ineffectual when said movable rail section is in its up position.

ARTHUR E. OZOUF.